United States Patent [19]
Hall et al.

[11] Patent Number: 5,435,672
[45] Date of Patent: Jul. 25, 1995

[54] HOLE SAW HAVING PLUG EJECTION FEATURE

[75] Inventors: Richard L. Hall, Lincolnton, N.C.; Donald M. Szymanski, Prospect, Ky.

[73] Assignee: Vermont American Corporation, Louisville, Ky.

[21] Appl. No.: 284,819

[22] Filed: Aug. 5, 1994

[51] Int. Cl.⁶ .............................................. B23B 51/05
[52] U.S. Cl. ..................................... 408/68; 408/204
[58] Field of Search ......................... 408/68, 204–206, 408/703

[56] References Cited

U.S. PATENT DOCUMENTS

| | | | |
|---|---|---|---|
| 4,030,560 | 7/1977 | Clark et al. | 408/204 |
| 4,741,651 | 5/1988 | Despres | 408/204 |
| 4,968,189 | 11/1990 | Pidgeon | 408/204 |
| 5,035,548 | 7/1991 | Pidgeon | 408/68 |
| 5,076,741 | 12/1991 | Littlehorn | 408/68 |
| 5,082,403 | 1/1992 | Sutton et al. | 408/68 |
| 5,096,341 | 3/1992 | Despres | 408/68 |

Primary Examiner—Steven C. Bishop
Attorney, Agent, or Firm—Middleton & Reutlinger; James C. Eaves, Jr.

[57] ABSTRACT

A hole saw having plug ejection feature. Using the arbor and arbor nut of the present invention, the arbor of an ordinary commercially available hole saw is replaced, the arbor nut of the present invention being threaded into the hole saw cup axial threaded inlet, to convert the ordinary hole saw into a plug ejecting hole saw. The arbor and arbor nut of the plug ejecting hole saw of the present invention function as the arbor of an ordinary hole saw when used with to drill the desired hole, the drill turning in a clockwise direction. When the drill rotation is reversed to a counter clockwise direction and the hole saw cup is held stationary, the arbor of the present invention screws through the also stationary arbor nut, thereby ejecting the plug from the hole saw cup.

7 Claims, 3 Drawing Sheets

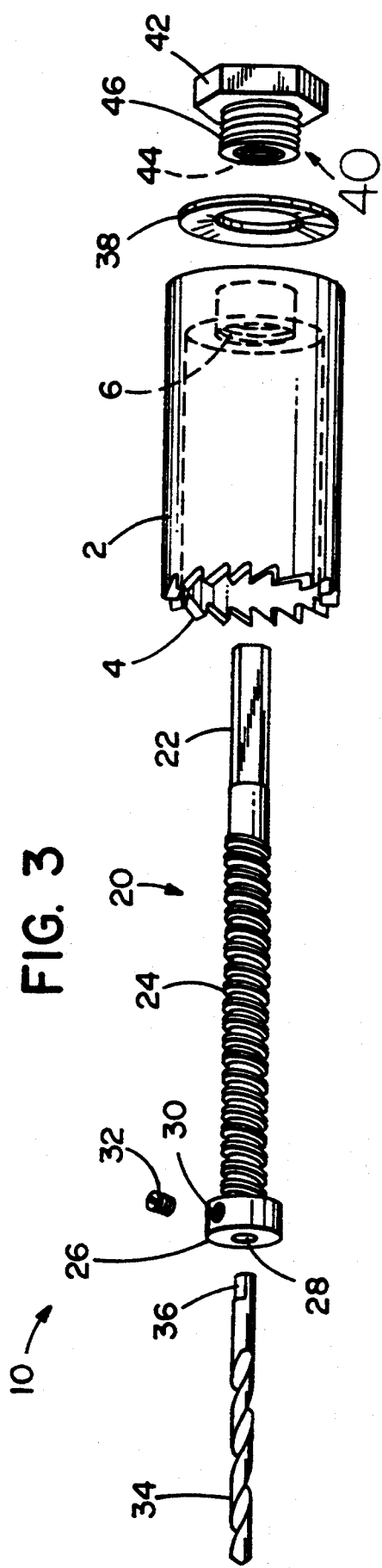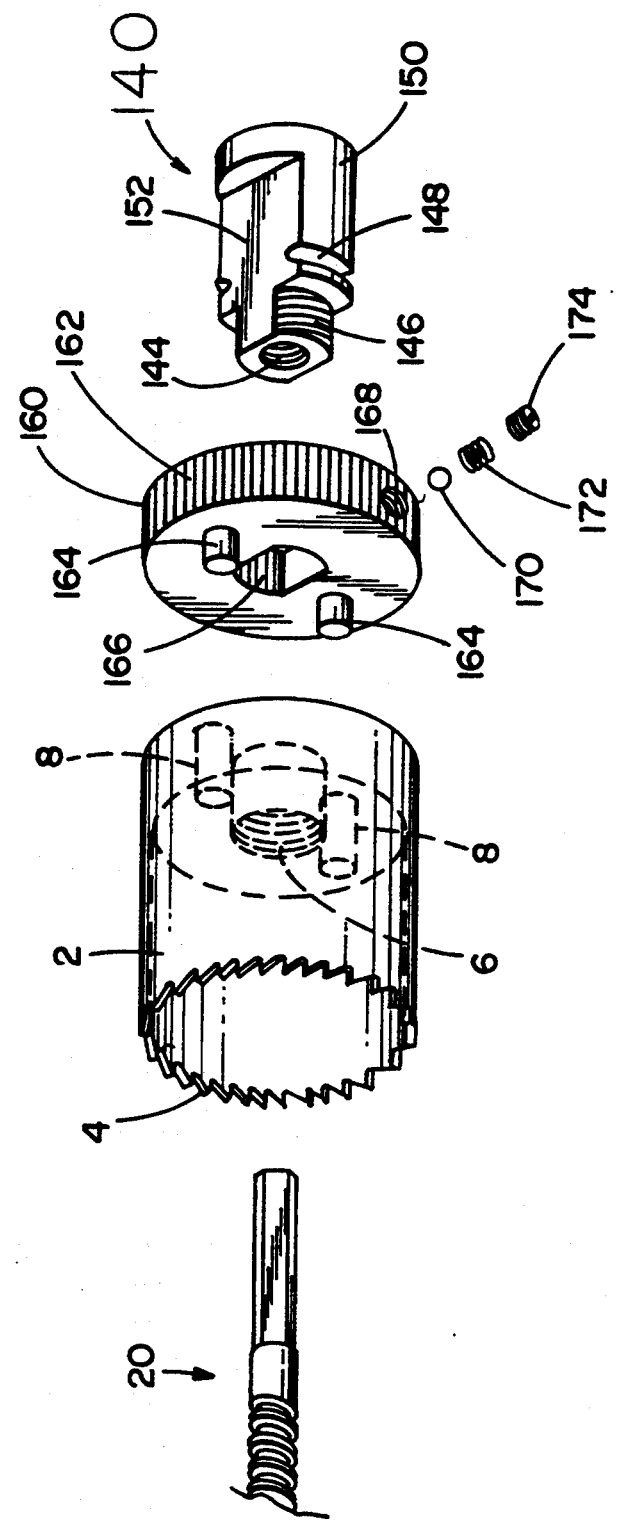

HOLE SAW HAVING PLUG EJECTION FEATURE

BACKGROUND OF THE INVENTION
(a) Field of the Invention

The present invention relates to a hole saw having plug ejection feature. Using the arbor and arbor nut of the present invention, the arbor of an ordinary commercially available hole saw is replaced, the arbor nut of the present invention being threaded into the hole saw cup axial threaded inlet, to convert the ordinary hole saw into a plug ejecting hole saw. The arbor and arbor nut of the plug ejecting hole saw of the present invention function as the arbor of an ordinary hole saw when used to drill the desired hole, the drill turning in a clockwise direction. When the drill rotation is reversed to a counter clockwise direction and the hole saw cup is held stationary, the arbor of the present invention screws through the also stationary arbor nut, thereby ejecting the plug from the hole saw cup.

(b) Description of the Prior Art

Hole saws, such as those designed to be used to drill "larger" circular holes, such as a 2 inch (50.8 mm) hole in a door for insertion of a lock cylinder, typically have a hole saw cup having an open cutting end with many cutting teeth, the cup having a diameter equal to the size of the hole to be cut. The cup has a base end transverse to the cup axis and opposed to the open cutting end. The base end has an axially aligned central threaded bore. This bore receives a threaded axial arbor. The arbor has an axially aligned pilot drill extending from the cup base end beyond the cup open cutting end. Typically, this is a ¼ inch (6.35 mm) diameter drill. This pilot drill first contacts the member to be drilled, drilling a center hole which keeps the cup's open cutting end properly positioned while drilling the hole. In some hole saws, the pilot drill may extend all the way through the arbor so that the non-drilling end of the pilot drill is received into the drill with which the hole saw is used, just like any ordinary drill bit. Alternatively, the arbor may have an axially extending member which is received by the drill, the arbor securely retaining the pilot drill. For example, the arbor may have an axial bore therein with a set screw being used to retain the pilot drill in the axial bore. For a more secure fit, the pilot drill may have a flattened or chamfered portion which mates with the set screw to alleviate any tendency of the pilot drill to turn within the axial bore.

Typically, in hole saws with cups having a diameter of from ⅞ inch (22.225 mm) to 1 and 3/16 inch (30.162 mm), the cup base end axially aligned central threaded bore and the mating threaded axial arbor have a diameter of ½ inch (12.7 mm) with right-handed threads thereon. Typically, there are 20 threads per inch (25.4 mm). In hole saws with cups having a diameter of 1½ inch (38.1 mm) and larger, the cup base end axially aligned central threaded bore and the mating threaded axial arbor have a diameter of ⅝ inch (15.875 mm) with right-handed threads thereon. Typically, there are 18 threads per inch (25.4 mm).

In the larger cups, drilling the larger holes, without more, the threaded connection of the arbor into the axially aligned central threaded bore receives all of the torque transferred by the drill. To alleviate this, some of the larger cups have bores into their base ends, the bores being diametrically opposed and equally spaced from the axis. The arbor can contain matching bores therein. Drive pins can then be inserted into the arbor bores and cup bores.

As a typical door is about 1 and ¾ inch thick (44.45 mm), so that they can be used to drill completely through doors and the like, generally, hole saw cups have a depth of at least 2 inches (50.8 mm), the distance from the open cutting end to the base end. Some are deeper.

When a hole is completely drilled, for example through a door, when the cup open cutting end completes its cutting, a circular plug of cut material is retained on the pilot drill within the hole saw cup. Removal of this plug can be difficult. Some hole saw cups have openings or slits in their cup sides. The operator can try to "wiggle" the plug up out of the cup using these cup side slits. However, this can still be difficult.

U.S. Pat. No. 4,741,651, to Despres, tried to solve this problem. In Despres, a hole saw cup having left hand threads, instead of the ordinary right hand threads, in its base end threaded axial bore is taught. An arbor having a left hand threaded portion is threaded into the base end threaded axial bore. Within the hole saw cup, the threaded portion has a larger diameter flange portion thereon. This portion receives the pilot drill. Opposed to the pilot drill, the arbor has a shank portion to be received by a drill. In drilling a hole, the drill, and thus the hole saw, turn to the right, or in a clockwise direction. Therefore, the arbor will be threaded out of the cup so that the larger diameter flange portion will be forced to its closest possible location to the inside hole saw cup base end. After the hole is drilled, a pair of wrenches is used to initially break the tightened larger diameter flange portion from the hole saw cup base end. Then, if a reversible drill is used, the drill direction of rotation is reversed to counter clockwise and, holding the cup with a wrench to prevent rotation, the drill is operated to thread the arbor threaded portion up through the cup so that the plug is ejected.

SUMMARY OF THE INVENTION

The present invention is for a hole saw having plug ejection feature. More particularly, the present invention permits an ordinary hole saw without the plug ejecting feature to be converted to a plug ejecting hole saw using the same hole saw cup. As hole saw sets are often sold, the sets having a plurality of hole saw cups of various diameters and one or more arbors which can be threaded into the desired diameter cup, the present invention has a great advantage over the prior art, as prior art plug ejecting hole saws cannot use any components of the ordinary hole saw without the plug ejecting feature. With the conversion kit of the present invention, the existing cups can be employed with the new plug ejecting arbor and arbor nut of the present invention to convert the ordinary hole saw without the plug ejecting feature to a plug ejecting hole saw.

More particularly, in combination with a hole saw cup, the cup having an open cutting end and a base end, the cup having an axis, the axis being transverse to the base end, the open cutting end having a plurality of saw teeth thereon for cutting in a first direction of rotation, the base end being opposed to the open cutting end, the base end having an axial bore therethrough, the axial bore having internal threads therein, the internal threads advancing from the base end toward the open cutting end in the first direction of rotation, the improvement of the present invention comprises: a plug ejecting arbor, the plug ejecting arbor having a threaded portion, the threaded portion having a drill end and an opposed plug ejecting end; the plug ejecting arbor having a shank portion adjacent the threaded portion at the drill end; the plug ejecting arbor having a plug ejecting portion adjacent the threaded portion at the plug ejecting end; the plug ejecting portion having an axial pilot drill extending therefrom; the threaded portion having external threads thereon, the external threads advancing from the drill end toward the plug ejecting end in a second direction of rotation, the second direction of rotation being opposite of the first direction of rotation; and, an arbor nut, the arbor nut having a drill end and a hole saw end, the arbor nut having external threads thereon, the external threads advancing from the drill end toward the hole saw end in the first direction of rotation; the arbor nut having an axial bore therethrough, the axial bore having internal threads therein, the internal threads advancing from the drill end toward the hole saw end in the second direction of rotation; where the arbor nut external threads are threadably received by the internal threads of the axial bore in the hole saw cup and where the shank end of the plug ejecting arbor is inserted through the arbor nut axial bore and through the axial bore in the hole saw cup, the shank end being inserted from the open cutting end of the hole saw cup, the arbor nut internal threads threadably receiving the plug ejecting arbor threaded portion.

Finally, means for exerting pressure between the hole saw cup and the arbor nut, such as a belleville washer, can be included between them. Also, if the hole saw cup has radial bores in the base end, a collar having pins extending therefrom can be retained by the arbor nut so that the pins are received in the radial bores. The pins help transfer some of the drill twisting force to the hole saw cup so that all twisting forces are not placed onto the threaded connection between the arbor nut and hole saw cup.

BRIEF DESCRIPTION OF THE DRAWINGS

A better understanding of the present invention will be had upon reference to the following description in conjunction with the accompanying drawings, wherein:

FIG. 3 shows an exploded perspective view of the first embodiment of the plug ejecting hole saw of the present invention of FIG. 1;

FIG. 4 shows an exploded perspective view of a collar and arbor nut of a second embodiment; and, FIG. 5 shows a section view of the collar and arbor nut of the second embodiment of FIG. 4 to show a spring loaded ball fitting into the arbor nut groove to retain the collar pins in the diametrically opposed bores in the hole saw cup base end.

DETAILED DESCRIPTION OF THE PREFERRED EMBODIMENT

Figure 1:
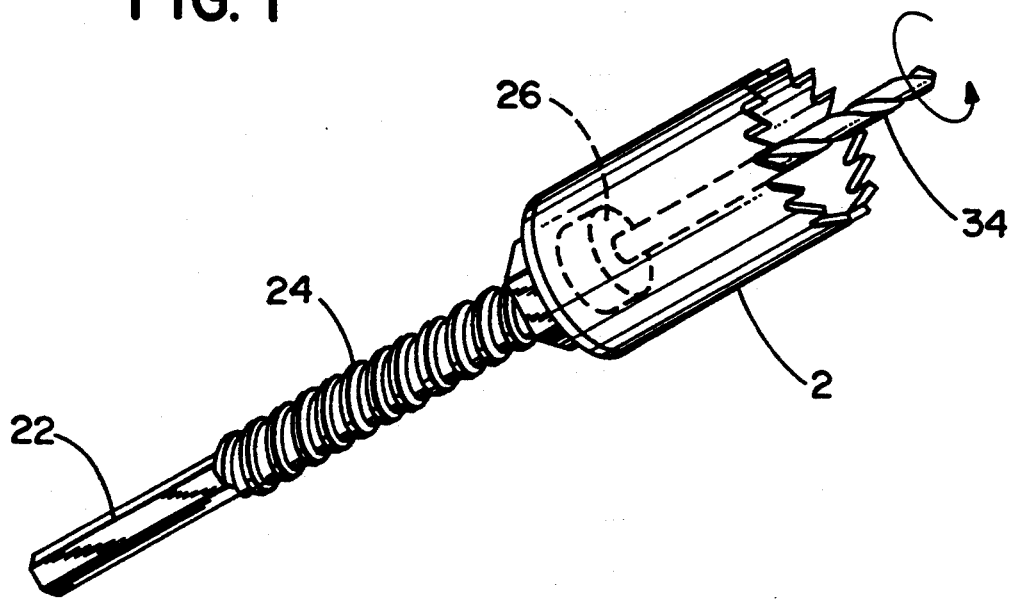
FIG. 1 shows a perspective view of a first embodiment of the plug ejecting hole saw of the present invention, having selected portions in phantom, the hole saw configured for drilling a hole.
Figure 2:
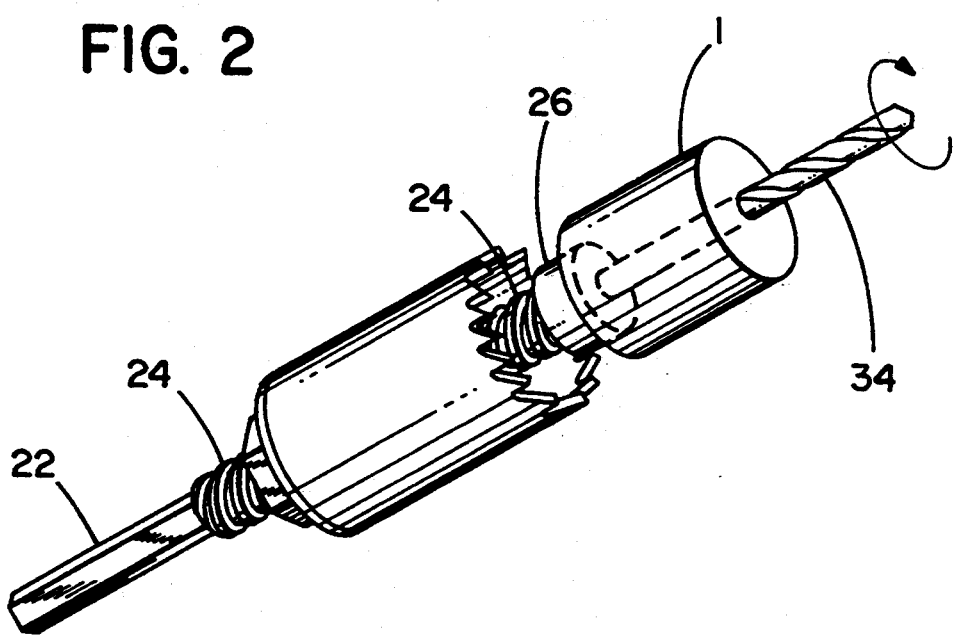
FIG. 2 shows a perspective view of the first embodiment of the plug ejecting hole saw of the present invention of FIG. 1, having selected portions in phantom, the hole saw having been used to drill a hole, the plug being ready for removal.

With reference to the Figures, two embodiments of the present invention are shown. FIGS. 1-3 show the hole saw having plug ejecting feature 10 of the first embodiment. In FIG. 1, the hole saw is shown ready to be used, the pilot drill 34 to turn in a clockwise direction. The plug ejecting portion 26 of arbor 20 is at its closest position to the base end of hole saw cup 2. After the hole has been drilled, a plug 1 remains on pilot drill 34 within hole saw cup 2. By turning the arbor 20 in a counter clockwise direction, the arbor threads up out of cup 2 causing the arbor 20 plug ejecting portion 26 to eject plug 1 from cup 2, as shown in FIG. 2.

As seen further in FIGS. 1-3, hole saw cup 2 has a desired diameter. Cup 2 has an open cutting end having cutting teeth 4 therearound. Cup 2 has a base end opposed to open cutting end. Cup 2 has a central axis. The base end has a right hand threaded inlet or bore 6 to receive a threaded arbor body, whether the arbor without plug ejection of the prior art, or the plug ejecting arbor nut 40 (or 140 of the second embodiment explained hereinafter) of the present invention. Cup 2's base end may have at least two diametrically opposed radial bores 8 therethrough, as seen in FIG. 4. Bores 8 are an equal distance from the cup axis. Typical cups 2 have four bores 8, with a ninety degree spacing between each pair of radial bores 8.

Plug ejecting arbor 20 of the present invention has a shank portion for insertion into and retention by a drill, shown as hex portion 22. Arbor 20 also has a left hand arbor threaded portion 24. Opposed to hex portion 22 is a plug ejecting portion 26, having a diameter greater than the diameter of the threaded portion 24. As the plug ejecting portion 26 must fit within the cup 2, its diameter must be less than the cup's diameter. The threaded portion 24's diameter must be such that portion 24 fits easily through bore 6, to be threadably received by arbor nut 40 or 140, as explained hereinafter. Also, threaded portion 24 must be of sufficient length to be able to eject plug 1 from cup 2. Preferred threading and dimensions of arbor 20 will be provided after arbor nut 40 is described.

Plug ejecting portion 26 is shown as having a circular disk shape. An axial bore 28 is sized to receive a pilot drill 34 therein. Portion 26 may have a threaded radial bore 30 thereinto, radial bore 30 connecting to bore 28. A threaded set screw 32, for example, having a diameter of ¼ inch (6,350 mm) with 28 threads per inch (25.4 mm) may be threaded into bore 30 to retain pilot drill 34 within bore 28. Pilot drill 34 may have a flattened or chamfered surface 36 which is aligned to engage set screw 32 to more securely retain pilot drill 34 within bore 28.

Arbor nut 40 is shown having a hex shaped portion 42 at its drill end and a right hand threaded portion 46 at its cup engaging end. Right hand threaded portion 46 is sized and has matching threads so that it can be securely threaded into hole saw cup 2's right hand threaded bore 6. Arbor nut 40 is shown having an axial bore therethrough, the axial bore being left hand inside threaded portion 44. Left hand threaded portion 44 is sized and has matching threads so that arbor 20 left hand threaded portion 24 can be securely threaded therethrough.

As was mentioned in the description of the prior art above, in hole saws with cups 2 having a diameter of from ⅞ inch (22.225 mm) to 1 and 3/16 inch (30.162 mm), the cup 2 base end axially aligned central threaded bore 6 and the mating threaded axial arbor typically have a diameter of ½ inch (12.7 mm) with right-handed threads thereon. Typically, there are 20 threads per inch (25.4 mm). Therefore, for cups of this size, one arbor nut 40 of the present invention will have outside threaded portion 46 with a matching ½ inch (12.7 mm) diameter and 20 threads per inch (25.4 mm). A preferred diameter of arbor 20's left hand arbor threaded portion 24 and arbor nut 40's left hand inside threaded portion 44 is 0.364 inch (9.25 mm). Left hand double lead Acme threads are preferred, with the equivalent of 11 threads per inch (25.4 mm), each diametrically opposed thread making 5½ revolutions per inch (25.4 mm). As plug ejecting portion 26 must fit within cups 2 with diameter as small as ⅞ inch (22.225 mm), plug ejecting portion 26 may have a diameter of 0.7 inch (17.78 mm), for example. Arbor 20's hex portion 22 may have a diameter of 0.235 inch (5.969 mm) so as to fit a "quarter inch (6.350 mm) drill". As was mentioned, threaded portion 24 must be of sufficient length so that portion 26 can eject plug 1 from cup 2. Typically, threaded portion 24 can have a length of about 2.4 inches (61 mm).

Also, as was mentioned in the description of the prior art above, in hole saws with cups having a diameter of 1½ inch (38.1 mm) and larger, the cup base end axially aligned central threaded bore and the mating threaded axial arbor have a diameter of ⅝ inch (15.875 mm) with right-handed threads thereon. Typically, there are 18 threads per inch (25.4 mm). Therefore, for cups of this size, one arbor nut 40 of the present invention will have outside threaded portion 46 with a matching ⅝ inch (15.875 mm) diameter and 18 threads per inch (25.4 mm). A preferred diameter of arbor 20's left hand arbor threaded portion 24 and arbor nut 40's left hand inside threaded portion 44 is 0.5 inch (12.7 mm). Left hand double lead Acme threads are preferred, with the equivalent of 8 threads per inch (25.4 mm), each diametrically opposed thread making 4 revolutions per inch (25.4 mm). Plug ejecting portion 26 must fit within cups 2 with diameter as small as 1½ inch (38.1 mm). However, plug ejecting portion 26 may be satisfactorily sized as with the small diameter cups discussed above, that is, having a diameter of 0.7 inch (17.78 mm), for example. Arbor 20's hex portion 22 may have a diameter of 0.344 inch (8.74 mm) so as to fit a "three-eighth inch (9.525 mm) drill". Again, threaded portion 24 must be of sufficient length so that portion 26 can eject plug 1 from cup 2. As with the small diameter cups discussed above, threaded portion 24 can have a length of about 2.4 inches (61 mm), for example.

When preparing to drill a hole, arbor 20's left hand threaded portion 24 is threaded through arbor nut 40's left hand inside threaded portion 44 so that plug ejecting portion 26 is at its closest position to the base end inside cup 2. Clockwise turning to drill a hole of the arbor 20, and hence cup 2, causes arbor nut 40's right hand threaded portion 46 to more securely thread itself into right hand threaded bore 6. However, after drilling the hole, the remaining plug 1 is to be removed by reversing the drill to a counter clockwise rotation. Securing the cup 2 and operating the drill should cause the arbor 20's left hand threaded portion 24 to thread so that the plug ejecting portion 26 moves away from the base end of the cup 2 thereby ejecting the plug 1 from inside the cup 2. However, securing the cup 2 and turning the arbor 20 in a counter clockwise direction could cause arbor nut 40 to loosen its clockwise threading into bore 6. Therefore means for exerting pressure between the hole saw cup 2 and the arbor nut 40 can be included therebetween. For example, a Belleville washer 38 may be used as the pressure exerting means. However, lock-type washers, springs, and similar pressure exerting means may be employed.

As seen, Belleville washer 38 is sized to fit over arbor nut 40's outside threaded portion 46, to be retained against cup 2 by arbor nut 40's hex portion 42. Belleville washer 38 has a concave like surface which faces cup 2. Hex portion 42 is tightened against Belleville washer 38's opposed convex like surface to exert pressure between arbor nut 40 and cup 2.

Figure 5:
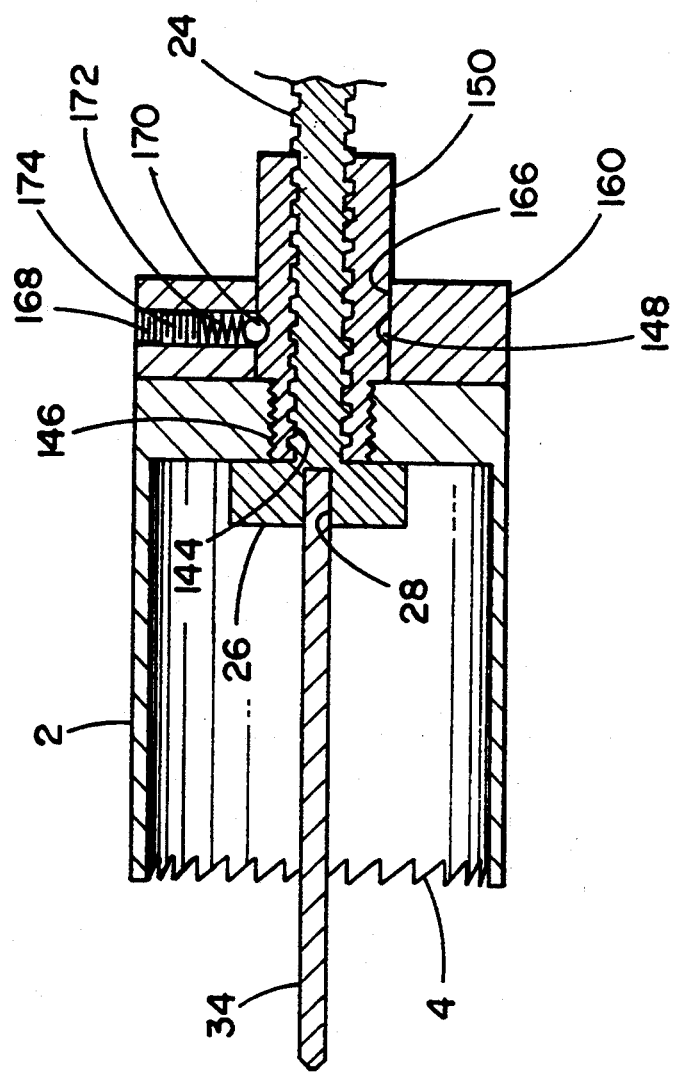

While the first embodiment of FIGS. 1–3 can be employed with all plug ejecting hole saw conversion kits of the present invention, as was mentioned earlier, in the larger cups, it is thought desirable that the axially aligned central threaded bore not be required to receive all of the torque transferred by the drill in drilling the larger holes. Therefore, with reference to FIGS. 4 and 5, an alternative arbor nut 140 with its associated collar 160 is shown. With this second embodiment, the same arbor 20 with extending pilot drill 34 are used as was described with the first embodiment of FIGS. 1–3. Therefore, arbor nut 140 has a central axial bore therethrough, the bore having left hand inside threaded portion 144, which receives arbor 20's left hand threaded portion 24 as did inside threaded portion 44 of arbor nut 40.

As with arbor nut 40, arbor nut 140 is designed with right hand outside threaded portion 146 which will be threadably secured in right hand threaded bore 6 of cup 2. Collar 160 has a pair of diametrically opposed pins 164 extending from its cup end cup engaging surface to engage a pair of pin bores 8 in the base end of cup 2.

Arbor nut 140 and collar 160 are designed so that collar 160 can not rotate on arbor nut 140. As seen, this can be accomplished by making the central axial bore 166 in collar 160 non-circular. As seen, bore 166 has a preferred "double D" shape, or the appearance of two capital D's placed back to back. Arbor 140 has a similarly shaped collar receiving portion 150, shown having flats 152. Also, arbor nut 140 is designed so that collar 160 can slide on it lengthwise toward the drill end, so that portion 146 can be threaded into bore 6, without pins 164 interfering. This is accomplished by having arbor nut 140 be of sufficient length and the flats 152 be of sufficient length so that collar 160 can have its bore 166 slide over collar receiving portion 150 far enough toward the drill end so that the pins 164 are not in the way of threaded portion 146. As shown, flats 152 do not extend fully to the drill end of arbor nut 140. This prevents collar 160 from falling off of nut 140 toward the drill. However, flats 152 could extend fully to the drill end of arbor nut 140.

After portion 146 is threaded into bore 6, one can slide collar 160 along collar receiving portion 150 and flats 152 toward the cup end so that the pair of diametrically opposed pins 164 can engage the pair of pin bores 8 in the base end of cup 2. Collar 160 is shown having a knurled outer surface 162 to make sliding collar 160 back and forth along collar receiving portion 150 easier. In this engaging position, the arbor nut 140 and the collar 160 can have cooperating means for retaining the radially aligned pins 164 in the radially aligned bores 8. As seen, this cooperating retaining means is provided by collar 160's spring-loaded groove engaging ball 170 being engaged into arbor nut 140's groove 148. Groove 148 is shown as a circumferential groove passing at least partway around the arbor nut 140. A properly positioned simple ball-shaped indentation could also be employed. A radial bore 168 passes from knurled surface 162 into bore 166. Bore 168 is threaded toward surface 162 for threadably receiving a set screw 174.

Spring-loaded groove engaging ball 170 is inserted into bore 168. Spring 172 is between ball 170 and set screw 174, spring 172 thereby encouraging or pushing ball 170 toward bore 166 to engage arbor nut 140. With diametrically opposed pins 164 engaging pin bores 8 in the base end of cup 2, ball 170 engages groove 148 to provide the cooperating retaining means. If the operator wishes, for example, to use another sized cup 2 to drill a different sized hole, the operator encourages the collar 160 toward the drill end of nut 140. Groove 148 is "V"-shaped, so that this encouragement will cause ball 170 to press against spring 172 and thereby move toward set screw 174 permitting collar 160 to slide along portion 150 toward the drill end. When opposed pins 164 no longer engage pin bores 8, arbor nut 140 can be threadably removed from bore 6 of cup 2.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. In combination with a hole saw cup, the cup having an open cutting end and a base end, the cup having an axis, the axis being transverse to the base end, the open cutting end having a plurality of saw teeth thereon for cutting in a first direction of rotation, the base end being opposed to the open cutting end, the base end having an axial bore therethrough, the axial bore having internal threads therein, the internal threads advancing from the base end toward the open cutting end in the first direction of rotation, the improvement which comprises:

a. a plug ejecting arbor, said plug ejecting arbor having a threaded portion, said threaded portion having a drill end and an opposed plug ejecting end; said plug ejecting arbor having a shank portion adjacent said threaded portion at said drill end; said plug ejecting arbor having a plug ejecting portion adjacent said threaded portion at said plug ejecting end; said plug ejecting portion having an axial pilot drill extending therefrom; said threaded portion having external threads thereon, said external threads advancing from said drill end toward said plug ejecting end in a second direction of rotation, said second direction of rotation being opposite of said first direction of rotation; and, b. an arbor nut, said arbor nut having a drill end and a hole saw end, said arbor nut having external threads thereon, said external threads advancing from said drill end toward said hole saw end in said first direction of rotation; said arbor nut having an axial bore therethrough, said axial bore having internal threads therein, said internal threads advancing from said drill end toward said hole saw end in said second direction of rotation;

c. where said arbor nut external threads are threadably received by the internal threads of the axial bore in the hole saw cup and where said shank end of said plug ejecting arbor is inserted through said arbor nut axial bore and through the axial bore in the hole saw cup, said shank end being inserted from the open cutting end of the hole saw cup, said arbor nut internal threads threadably receiving said plug ejecting arbor threaded portion.

2. The hole saw of claim 1, further comprising: means for exerting pressure between the hole saw cup and said arbor nut.

3. The hole saw of claim 2, where said means for exerting pressure between the hole saw cup and said arbor nut comprises: a belleville washer, said belleville washer having a central bore therethrough, said belleville washer being inserted over said shank end of said plug ejecting arbor between said arbor nut and the hole saw cup.

4. The hole saw of claim 1, where the hole saw cup base end has at least two radially aligned bores therethrough, the radially aligned bores being a first equal distance from the axis, the improvement further comprising: a collar, said collar having an axial bore therethrough, said collar having a cup end and a drill end, said cup end defining a hole saw cup engaging surface, said hole saw cup engaging surface having a pair of radially aligned pins extending therefrom, said radially aligned pins being said first equal distance from the axis; said arbor nut having a collar receiving portion from said hole saw end toward said drill end, said collar being slidably received by said arbor nut collar receiving portion, said radially aligned pins being receivable by the radially aligned bores.

5. The hole saw of claim 4, where said arbor nut and said collar have cooperating means for retaining said radially aligned pins in said radially aligned bores.

6. The hole saw of claim 5, where said cooperating means for retaining said radially aligned pins in said radially aligned bores comprise: a groove in said arbor nut, said groove being a circumferential groove passing at least partway around said arbor nut; and a spring-loaded groove engaging ball, said spring-loaded groove engaging ball being received within a radial bore in said collar, said radial bore intersecting said collar axial bore, said radial bore having a set screw threadably received therein, said spring-loaded groove engaging ball and said set screw having a spring therebetween, said spring-loaded groove engaging ball being receivable into said groove in said arbor nut to retain said arbor nut and said collar in a desired relationship with said radially aligned pins within said radially aligned bores.

7. The hole saw of claim 2, where said means for exerting pressure between the hole saw cup and said arbor nut comprises: a washer, said washer having a central bore therethrough, said washer being inserted over said shank end of said plug ejecting arbor between said arbor nut and the hole saw cup.

* * * * *